F. A. STEVENS.
EYEGLASS MOUNTING.
APPLICATION FILED AUG. 27, 1908.
989,077.
Patented Apr. 11, 1911.
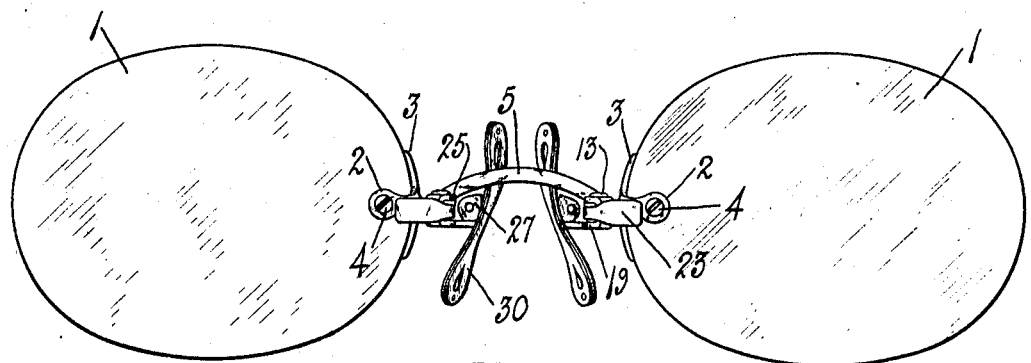
FIG. 1.
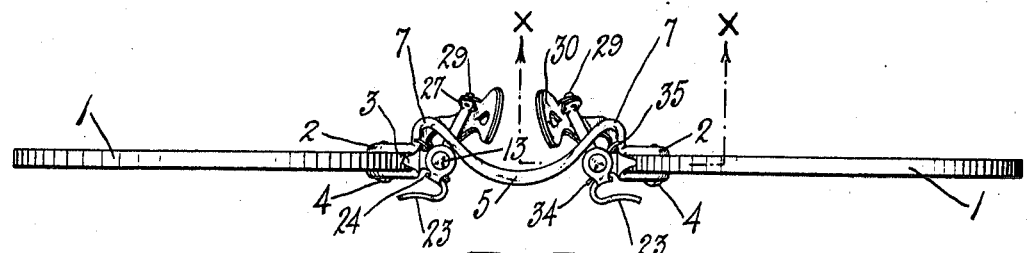
FIG. 2.
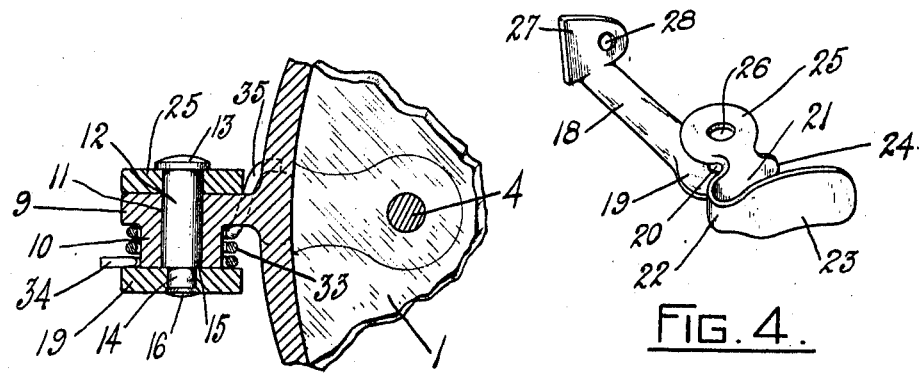
FIG. 3.
FIG. 4.
WITNESSES.
Albert G. Rugenkowski.
Joseph E. Burns
INVENTOR.
Frederick A. Stevens
By Horatio E. Bellows
ATTORNEY.

UNITED STATES PATENT OFFICE.

FREDERICK A. STEVENS, OF PROVIDENCE, RHODE ISLAND.

EYEGLASS-MOUNTING.

989,077. Specification of Letters Patent. Patented Apr. 11, 1911.

Application filed August 27, 1908. Serial No. 450,413.

*To all whom it may concern:*

Be it known that I, FREDERICK A. STEVENS, a citizen of the United States, residing at Providence, in the county of Providence and State of Rhode Island, have invented certain new and useful Improvements in Eyeglass-Mountings, of which the following is a specification.

My invention relates to that class of eyeglass mountings in which the lens frames are connected by a comparatively inflexible bridge and the nose holding functions are performed by pivoted arms which carry the guards.

The objects of my invention are those common to this class of eyeglasses, and further, to facilitate the adjustment of the lenses to any desired pupillary distance; to effect such adjustment without distorting the arch of the bridge relatively to the nose and without interference with the adjacent mounting parts; to assure unimpeded movement of the guard arms regardless of the degree of curvature of the bridge arch; to render the strap screws readily accessible; to avoid liability of contact by the fingers with the lenses when operating the nose pieces; to screen the springs and adjacent parts from sight when viewed from the front upon the face of the wearer, and to attain these ends by a simple, compact and inexpensive structure.

To the above ends essentially my invention consists in a structure in which the ends of the bridge are located in the sides of the straps and its adjacent portions are formed into rearwardly directed readily accessible loops; the guard arms constructed to swing below the plane of the ends of the bridge;
the guard arms provided with finger pieces, having reverse bends extending in front of the springs; and in the novel construction and combination of the various parts hereinafter described, and illustrated in the accompanying drawings, wherein—

Figures 1 and 2 are front and plan elevations respectively of a pair of eyeglasses embodying my invention. Fig. 3, a section of the same on line *x x* of Fig. 2, and Fig. 4, a perspective view of an operating arm.

Like reference characters indicate like parts throughout.

The invention applies to eyeglasses whether provided or not with rims. In this instance the invention is embodied in a pair of eyeglasses comprising the lenses 1, attaching lugs 2, edge lugs 3, screws 4, and bridge 5. The lens mountings shown are connected to the lenses by the screws 4 in the usual manner. From its central portion the bridge inclines downwardly and rearwardly to points in the rear of the vertical plane of the lenses thence extending forwardly forming bends 7 and their terminals constituting the rear sides of the lugs 2. Extending inwardly from each of the lugs 3 and in the vertical plane of the lenses is a flat bracket 9 having an integral downwardly directed cylindrical projection 10 upon its lower face. The bracket and projection are bored as at 11 to receive a pivot pin 12 having a head 13 and a preferably reduced end portion 14 forming an annular shoulder 15. The extremity of the end 14 is reduced to facilitate the subsequent riveting operation whereby the head 16 is formed.

Each operating arm is composed of a single piece of flat stock, and comprises a straight flat arm 18 with a circular forward end portion 19 provided with an opening 20. Integral with the end portion 19 is a portion 21 transversely disposed with relation to the arm and having an intermediate bend 22 formed by turning the broad free extremity 23 back into a plane nearly parallel with the plane of its base portion 21. The portion 23 is longer than its base portion. The portion 21 has a lug 24, and an integral flattened curved arm or lug 25 extending above and parallel with the arm 18 and provided with a perforation 26 in vertical alinement with the perforation 20. The flat integral parts 19, 21 and 25 of the operating arm constitute a looped portion or recess. The rear end of the arm 18 is provided with an upturned end portion 27 having a perforation 28 to receive a screw or rivet 29 of the guard 30. It will be understood, however, the portion 27 may be of any usual preferred form convenient for carrying a guard.

In assembling, each looped end 25 rests upon the upper surface of the bracket 9, and the portion 19 of the arm 18 rests against the under face of the tubular projection 10, with the openings 26 and 20 concentric with the opening 11. The pivot pin 12 passes through these three openings, and its end portion 14 is riveted to firmly engage the operating arm. The flat portion 19 of the operating arm has an extended bearing upon the sleeve 10, and forms a bearing and support for the operating spring, while the flat looped end 25 upon the flat face of the support 9 coöperates with the portion 19 to overcome torsional strain of the operating arm. The spring, by its location intermediate the over-hanging bracket and the portion 19 of the arm and within the loop, is protected and screened from observation from the front, above, and below. The overhanging bracket forms a fixed seat or bearing for the spring coil which makes the spring less liable to derangement than if the spring abutted at both ends against a movable part.

Around each projection 10 within the loop and bearing against the bracket is a helical spring 33, one of whose ends 34 contacts with the portion 21, and the other end 35 of which rests against the lug 2. This spring normally contracts the guard bearing ends; excessive contractive movement of the arms being limited by the lugs 24 against the brackets 9.

The bent portions 7 of the bridge 5 are located so as to give ample room for the operation of pliers when the bridge is bent to adjust the pupillary distance of the lenses, and make it possible to effect such adjustment without distorting the central portion of the bridge which rests upon the nose. Since the guard arms 18 swing below the bracket and the horizontal plane of the bridge all interference with the arch of the bridge and other operative parts is avoided. The finger pieces are so located and formed as to be readily grasped without contact of the fingers with the lenses, and their form and arrangement are such that when viewed from the front the springs are invisible.

What I claim is—

1. As an improved article of manufacture, an operating arm for use in eyeglass mountings formed of flat material and comprising in a single element a straight flat body portion provided at one end with a vertical loop in alinement with the body portion and terminating in a lug parallel with the body portion, and a transversely disposed finger piece upon the loop.

2. As an improved article of manufacture, an operating arm for use in eyeglass mountings formed of flat material and comprising in a single element a straight flat body portion provided at one end with a vertical loop in alinement with the body portion and terminating in a lug parallel with the body portion, and a transversely disposed finger piece integral with the loop.

3. As an improved article of manufacture, an operating arm for use in eyeglasses formed of flat material and comprising in a single element a straight flat body portion provided at one end with a circular portion and with a vertical loop in alinement with the body portion extending from the circular portion and terminating in a circular lug parallel with the circular portion and a transversely disposed finger piece integral with the loop.

4. As an improved article of manufacture, an operating arm for use in eyeglasses formed of flat material and comprising in a single element a straight flat body portion provided at one end with a circular portion and with a loop extending from the circular portion in alinement with the body portion and terminating in a lug parallel with the circular portion, said loop being adapted to receive a bearing member, and the circular portion and lug being provided with alined perforations for a pivot pin, and a finger piece upon the loop.

5. As an improved article of manufacture, an operating arm for use in eyeglass formed of flat material and comprising in a single element a straight flat portion having at one end an upturned portion with a perforation, and at the other end with a circular portion, a flattened loop extending from the circular portion and terminating in a lug parallel with the circular portion, said lug and circular portion being provided with alined perforations for a pivot pin, a laterally extending stop lug upon the loop and a transversely disposed finger piece also upon the loop.

6. The combination of a support comprising a bridging portion extending downwardly and rearwardly and thence bent forwardly at substantially right angles to the plane of the lenses, the forwardly extended portion constituting an arm, lens attaching devices secured to the outer side of the forward end of said arm, bearings located inwardly beyond the inner side of said arm, nose guards having portions carrying upper and lower nose engaging surfaces and operating beneath said arm, and an operating arm having a vertical loop in alinement with the body portion and a transversely disposed finger piece integral with said loop, the rear end of said arm having a portion for the attachment of a nose guard.

In testimony whereof I have affixed my signature in presence of two witnesses.

FREDERICK A. STEVENS.

Witnesses:
 HORATIO E. BELLOWS,
 WILLIAM E. TEFFT.

Copies of this patent may be obtained for five cents each, by addressing the "Commissioner of Patents, Washington, D. C."